J. H. PARSEGAN.
HAIR PLANTING INSTRUMENT.
APPLICATION FILED FEB. 3, 1913.
1,061,005.
Patented May 6, 1913.
4 SHEETS—SHEET 1.
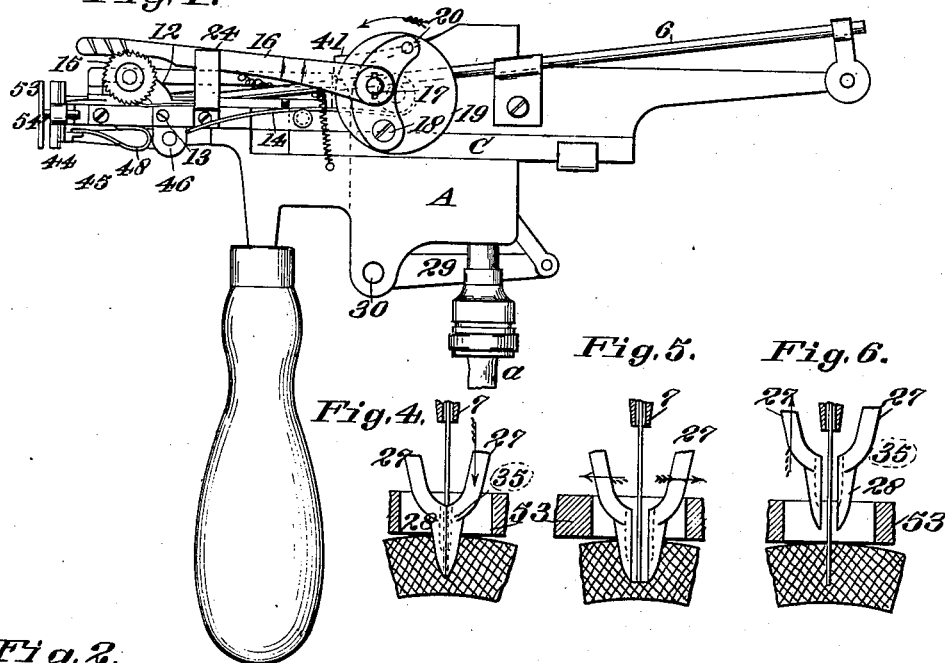
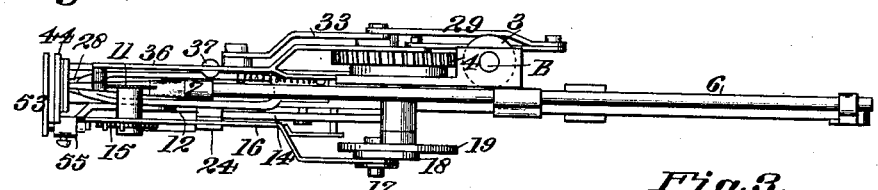
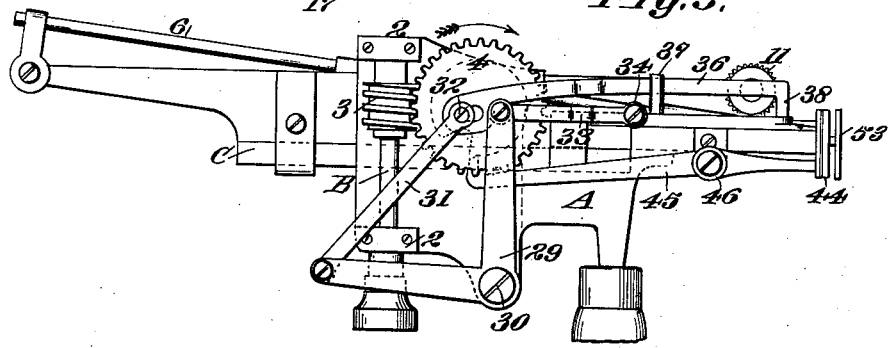
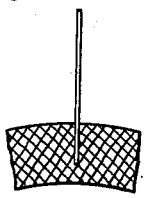
Fig. 7.
WITNESSES:
Charles Pickles
Thos. Castberg
INVENTOR
Jacob H. Parsegan
BY G. H. Strong
ATTORNEY J. H. PARSEGAN.
HAIR PLANTING INSTRUMENT.
APPLICATION FILED FEB. 3, 1913.
1,061,005.
Patented May 6, 1913.
4 SHEETS—SHEET 2.
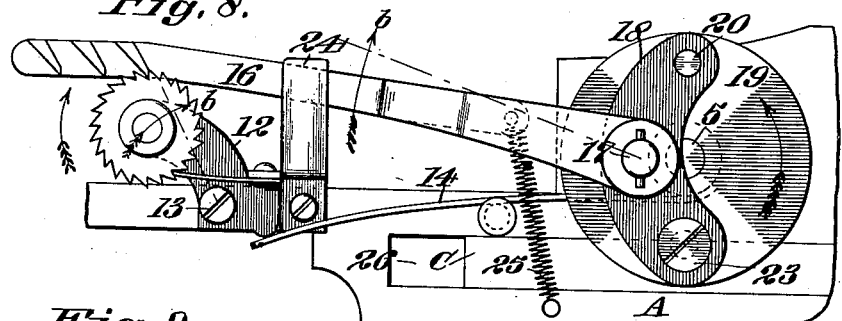
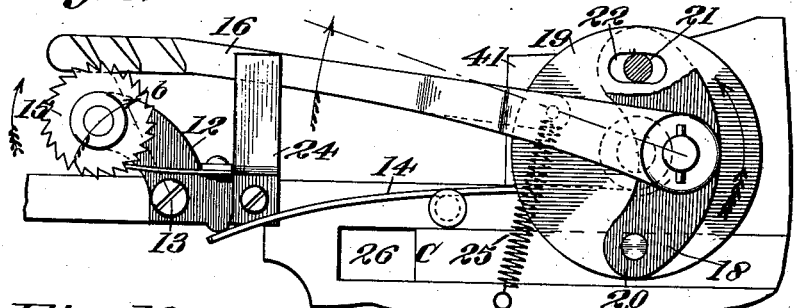
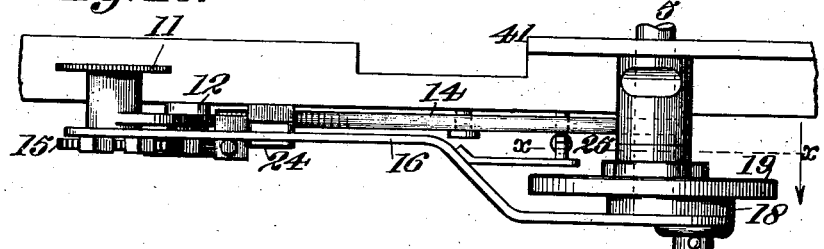
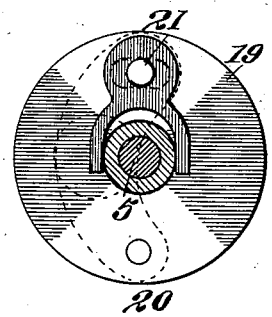
WITNESSES:
Charles Pickles
Thos Eastberg
INVENTOR
Jacob H. Parsegan
BY G. H. Strong
ATTORNEY J. H. PARSEGAN.
HAIR PLANTING INSTRUMENT.
APPLICATION FILED FEB. 3, 1913.
1,061,005.
Patented May 6, 1913.
4 SHEETS—SHEET 3.
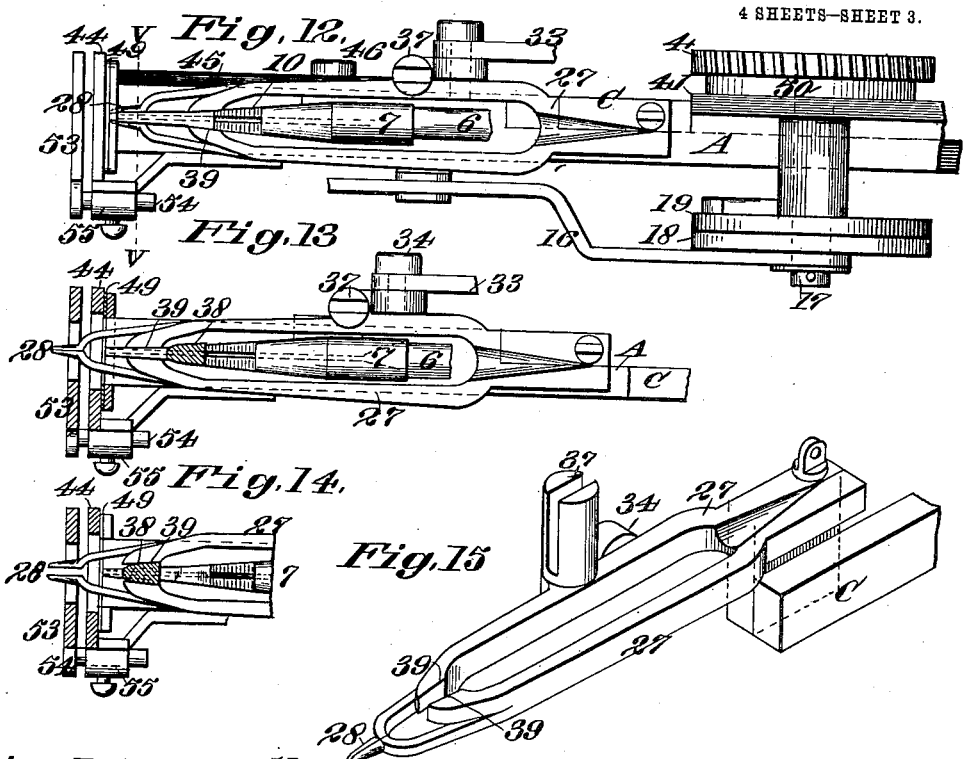
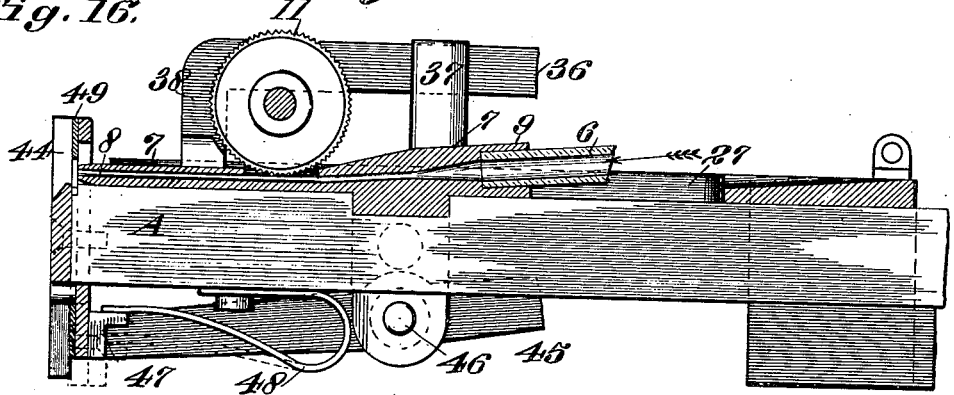
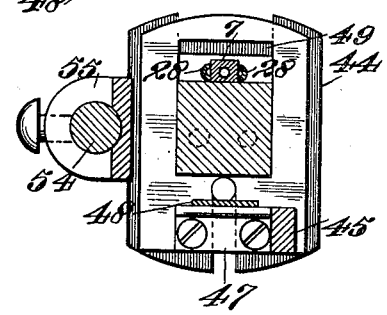
WITNESSES:
INVENTOR
Jacob H. Parsegan J. H. PARSEGAN.
HAIR PLANTING INSTRUMENT.
APPLICATION FILED FEB. 3, 1913.
1,061,005.
Patented May 6, 1913.
4 SHEETS—SHEET 4.
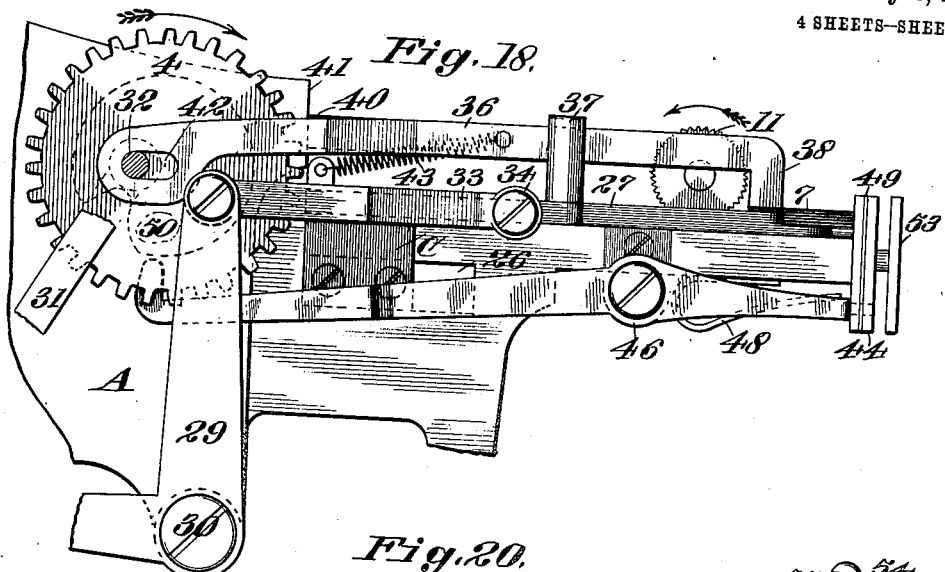
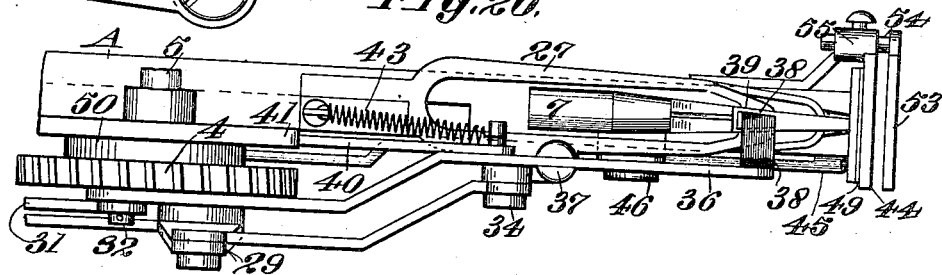
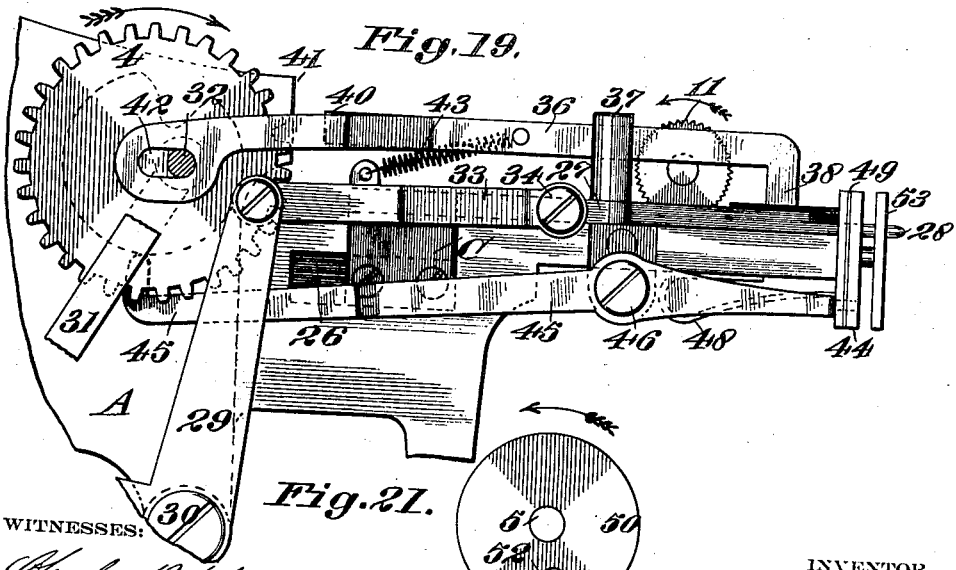
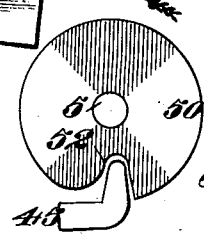
WITNESSES:
Charles Pickles
Thos Eastberg
INVENTOR
Jacob H. Parsegan
BY G. H. Strong
ATTORNEY

UNITED STATES PATENT OFFICE.

JACOB H. PARSEGAN, OF SAN FRANCISCO, CALIFORNIA.

HAIR-PLANTING INSTRUMENT.

1,061,005.

Specification of Letters Patent. Patented May 6, 1913.

Application filed February 3, 1913. Serial No. 745,954.

*To all whom it may concern:*

Be it known that I, JACOB H. PARSEGAN, a citizen of the United States, residing in the city and county of San Francisco and State of California, have invented new and useful Improvements in Hair-Planting Instruments, of which the following is a specification.

This invention relates to a hair planting or grafting implement.

The object of this invention is to provide a simple, substantial and practical implement which is so constructed that means are provided for supporting and feeding a hair of considerable length through the implement.

Another object of the invention is to provide an implement with means for puncturing the scalp, spreading the punctured opening in the scalp sufficiently to admit insertion of the hair, retracting the puncturing means, and severing the inserted section from the main hair section.

Further objects will appear hereinafter.
The invention consists of the parts and the construction and combination of parts as hereinafter more fully described and claimed, having reference to the accompanying drawings, in which—

Figure 1 is a side elevation of the implement. Fig. 2 is a plan view of same. Fig. 3 is another side elevation of the reverse side. Figs. 4, 5, 6, and 7, are diagrammatic views showing the puncturing and hair inserting implement in the various positions. Figs. 8 and 9 are enlarged detail views of the hair feeding mechanism, showing the actuating means in the opposite positions. Fig. 10 is a plan view of Fig. 9.
Fig. 11 is a section on the line X—X of Fig. 10. Figs. 12, 13, and 14 are plan views of the puncturing and hair inserting implement, showing it in the various positions, and also showing the adjusting plate by which the depth of the puncture in the scalp is regulated. Fig. 15 is a perspective view of the puncturing and hair inserting implement. Fig. 16 is an enlarged central section of the hair guiding, feeding and cutting means. Fig. 17 is a section on line V—V of Fig. 12. Figs. 18 and 19 are enlarged detail views in side elevation, showing the hair cutting actuating means. Fig. 20 is a plan view of Fig. 18. Fig. 21 is a detail view of the cam controlling the hair cutting mechanism.

Referring to the drawings A indicates in general the main supporting frame upon which the several actuating mechanisms are mounted.

B indicates the main driving shaft appropriately journaled in the main frame, as at 2, upon which is secured a worm gear pinion 3, from which power is transmitted through a worm gear 4 to a secondary shaft 5 journaled crosswise of the frame; power being transmitted to the main driving shaft from any suitable source by a flexible shaft *a*.

The hair to be transplanted or inserted into the scalp after being thoroughly sterilized, or otherwise treated to make it as staple as possible, is inserted in a glass tube or container 6, from where it is conveyed to a hair guiding and feeding mechanism.

The hair guiding mechanism is best shown in Figs. 12, 13, and 16. Particularly referring to the enlarged section in Fig. 16, it will be seen that the guiding means consists of an elongated member 7, suitably secured to the main frame A. This is provided with a central passage 8 extending through it; one end as 9 being cone shaped and considerably enlarged to receive the lower end of the glass tube 6. The central portion of the guide member is slotted as shown at 10 to admit the insertion of a feed roller or wheel 11, which is thus allowed to come into contact with the hair and will thus, when revolved, feed the hair through the central passage 8.

The feed roller is revolubly mounted on the outer end of a spring actuated arm 12, which is pivoted near one end to the main frame A, as at 13. The lower end of the arm is turned at a slight angle with relation to the upper portion of the arm and serves the function of a lever, through which pressure is transmitted by a spring 14 to normally keep the feed roller in contact with the hair.

The means for revolving the feed roller is particularly shown in the enlarged detail views of Figs. 8, 9, and 10, and consists of a ratchet wheel 15, secured to the same shaft as the feed roller 11. The ratchet wheel 15 is actuated by a rake or pawl member 16 connected at its inner end to a crank pin 17 mounted on an adjustable lever 18 secured to a disk 19 mounted upon the secondary shaft 5.

The adjustable lever 18 is pivoted at one end, as at 20, and is provided with a stud extension 21 in the upper end which projects through a slot 22 in the disk. This allows the lever 18 to be swung about the pivot 20 within the limits of the slot 22, and may be secured in any adjusted position by the screw or nut 23; this adjustment permitting a larger or smaller throw of the crank pin 17 and controlling pawl arm 16. The adjustable throw of the crank will thus control the hair feed. The outer end of the lever 16 is guided in an upright extension 24 secured on the main frame A, and is normally held within the guide member by the downward pull of a spring 25 also secured to the main frame.

The pivot arm 12 upon which the ratchet wheel and feed wheel are journaled together with the actuating pawl arm may be lifted in the direction of arrow $b$, at any time when it is desired to thread a new hair into the guide member 7.

Referring to Figs. 12, 13, 14, and 15, which are views showing the different positions of the puncturing and hair inserting implement, and referring in particular to the perspective view of Fig. 15, C indicates a sliding frame mounted for reciprocation in the slot 26 in the main frame. Extending outwardly from said frame is a pair of flexible arms 27, the outer ends of which are provided with needles 28. The flexible needle carrying arms 27 are so positioned that they may straddle the hair guiding member 7; as shown in the extreme positions of the sliding frame C as in Figs. 12 and 14.

The actuating means for reciprocating the puncturing implement is here shown as consisting of a bell crank 29, pivotally mounted as at 30 to the main frame. The lower end of the bell crank is connected by a link 31 to a crank pin 32 secured on the outer face of the worm wheel 4. The upper end of the bell crank member 29 is connected by a link 33 with a pin 34 secured to the side of one of the flexible extending arms 27. Thus it can be seen that the revolving movement of the worm wheel 4 will be transmitted through the crank pin 32, link 31, bell crank 29, and link 33 connecting with the pin 34 to reciprocate the sliding frame C upon which the puncturing and hair inserting implement, consisting of the flexible arms 27 and needle points 28, are mounted.

The hair feeding mechanism, which is actuated by the adjustable crank pin 17, mounted upon the disk 19, which is as before stated, secured to the secondary shaft 5, is so positioned and timed with relation to the reciprocal movement of the sliding frame C, which in turn is controlled by the movement of the crank pin 32 secured to the worm wheel 4, that the forward movement of the perforating and hair inserting needles is accompanied by a forward feeding movement of the hair to be planted. In fact the crank 17 may be so positioned as to feed the hair forward a predetermined distance; this being sufficient to insert the hair into a hollow or conical pocket 35 formed in the needle point. This preliminary feeding of the hair is just sufficient to force the hair into the bottom of the receiving pocket 35 when the needles, together with the hair, are ready to be inserted into the scalp; this being accomplished by the forward movement of the sliding frame C. The depth of insertion of the split perforating needle 28 is indicated in the diagrammatic view of Fig. 4. After the needle has reached the extreme limit of insertion, it is actuated by mechanism hereafter to be described, which spreads the needles apart, as shown by the diagrammatic view in Fig. 5. The hair feeding roller 11 being actuated by the feed ratchet and connected pawl arm, still continues feeding while the divided needle 28 is being opened, as shown in Fig. 5; the feeding movement of the roller 11 being just sufficient to force the hair into the bottom of the perforation produced by the needle. The open needle is then retracted, as indicated in Fig. 6, leaving the hair in the perforation made by the needle, this also permitting the removal of the needles from the scalp and allows the flesh around the perforation to close around the hair.

The means provided for opening and spreading the needle within the perforation, as indicated in Fig. 5, consists of a secondary sliding frame 36, the inner end of which is slotted and mounted upon the crank pin 32. The forward portion of the sliding frame 36 is guided in an upright member 37, and the extreme point of the frame is provided with a downwardly extending wedge-shaped member 38, so positioned that when the frame 36 is reciprocated the wedge-shaped point 38 will be in position to enter between opposite cam surfaces 39 formed at the outer end of the flexible arms 27. The backward movement of the sliding frame 36 is limited by an extension 40, forming a part of the sliding frame, contacting with a cam surface 41 formed on the main frame A.

The sliding frame 36 remains inactive during the time that the perforating and hair inserting implement is being forced into the scalp. This inactivity of the sliding frame is produced by the idle movement of the crank pin 32 within a slot 42. However, this inactivity takes place only through one-half of the stroke, while the other half of the stroke becomes active when the crank pin 32 engages with the inner end of the slot and forces the sliding frame 36 forward between the cam surfaces 39. This forward movement takes place the moment the perforating implement has reached its extreme outward stroke. A further movement of the crank pin will then be transmitted through the link 31 and connected parts, to retract the sliding frame C or perforating implement, while a spring 43 will retract the secondary sliding frame 36.

By referring to Fig. 12, the extreme retracted position of the perforating implement is shown. The hair inserted into the scalp is now cut to permit movement of the frame into a new position for the purpose of inserting a new section of hair. The hair cutting mechanism specially indicated in Figs. 16 and 17, consists of a vertically mounted sliding frame 44, guided and slidably mounted upon the end of the main frame A, as shown in Fig. 17. This sliding frame is actuated by a rocker arm 45, pivotally mounted to the main frame, as at 46. The outer end of the arm connected with the sliding frame is provided with an extension or lug 47, which in turn is actuated by the inner end of a spring 48 provided for the purpose of depressing the hair cutting or shearing frame. The shearing member is formed of a spring blade, indicated at 49, which is secured to the cutting frame in any suitable manner and is so positioned that the outer face of the hair guiding member 7 may be used as the opposite cutting blade or edge.

The inner end of the arm 45 is actuated by a cam 50 also secured upon the rotary secondary shaft 5. This cam is provided with an offset portion 51 which is so positioned that the moment the perforating implement has been retracted to the inner extreme position, shown in Fig. 12, it will allow the inner end of the arm 45 to drop into the offset; the inner end of the arm 45 being forced into this position by the action of the spring 48. This action will thus cause a downward movement of the cutting frame 44 and cause the shearing blade to sever the hair previously inserted into the scalp. A continued movement of the secondary shaft will almost immediately return the cutting frame to the normal open position by reason of the quick incline surface 52 formed on the cam, to return the lever 45 into normal position.

The return movement of the reciprocating sliding frame upon which the perforating and hair inserting implement is secured, is accompanied by a return movement of the pawl arm 16 on the opposite side of the implement, to the position shown in Fig. 8, where it is in readiness to revolve the feed roller and feed the hair forward in unison with the needle. The implement, as a whole, is then advanced into the forward perforating position where the same cycle of operation is again repeated; it being practical to run the mechanism at a speed of about 60 reciprocations a minute.

The forward portion of the frame is also provided with an adjusting plate 53, having an extension pin 54 adjustably secured in a bracket 55 secured to the main frame. The adjustable plate 53 is provided for the purpose of forming a spacer between the end of the frame and the scalp proper, thus providing means for controlling or adjusting the depth of the puncture in the scalp; this being necessary as it can easily be understood that the scalps of different individuals vary according to the condition of their health and age.

From this it can be seen that a comparatively simple implement has been provided, capable of inserting short sections of hair into the scalp; the hair sections inserted being severed from a hair of considerable length fed through the implement in conjunction with the operation of the puncturing implement.

Having thus described my invention, what I claim and desire to secure by Letters Patent, is—

1. A hair planting instrument, comprising in combination a frame, a perforating implement mounted on said frame, means for projecting and retracting said implement, means for supporting a hair, means for inserting said hair into the opening produced by the perforating implement, and means for severing the section of hair inserted.

2. A hair planting instrument comprising in combination a frame, a perforating implement reciprocally mounted on said frame, means for projecting and retracting said implement, means for supporting a hair, means for inserting said hair into the opening produced by the perforating implement, means for severing the section of hair inserted, and means for adjusting the depth of the perforation made by the perforating implement.

3. A hair planting instrument comprising in combination a frame, a perforating implement reciprocally mounted on said frame, means for projecting and retracting said implement, means for feeding and inserting a hair into the opening produced by the perforating implement, means for severing the section of hair inserted, means for adjusting the depth of the perforation made by the perforating implement, and means for adjusting the feeding mechanism.

4. A hair planting instrument, comprising in combination a frame, a reciprocating frame mounted on said frame, a pair of flexible normally contacting arms mounted on said frame, needle points formed on the ends of said arms, adapted to unite and form one needle, means for projecting and retracting the perforating implement consisting of the reciprocating frame, flexible arms and needles, means for spreading the needles in the projected position, means for feeding and inserting a hair into the opening between the needles and means for severing the section inserted.

In testimony whereof I have hereunto set my hand in the presence of two subscribing witnesses.

JACOB H. PARSEGAN.

Witnesses:
JOHN H. HERRING,
W. W. HEALEY.